Figure 1:
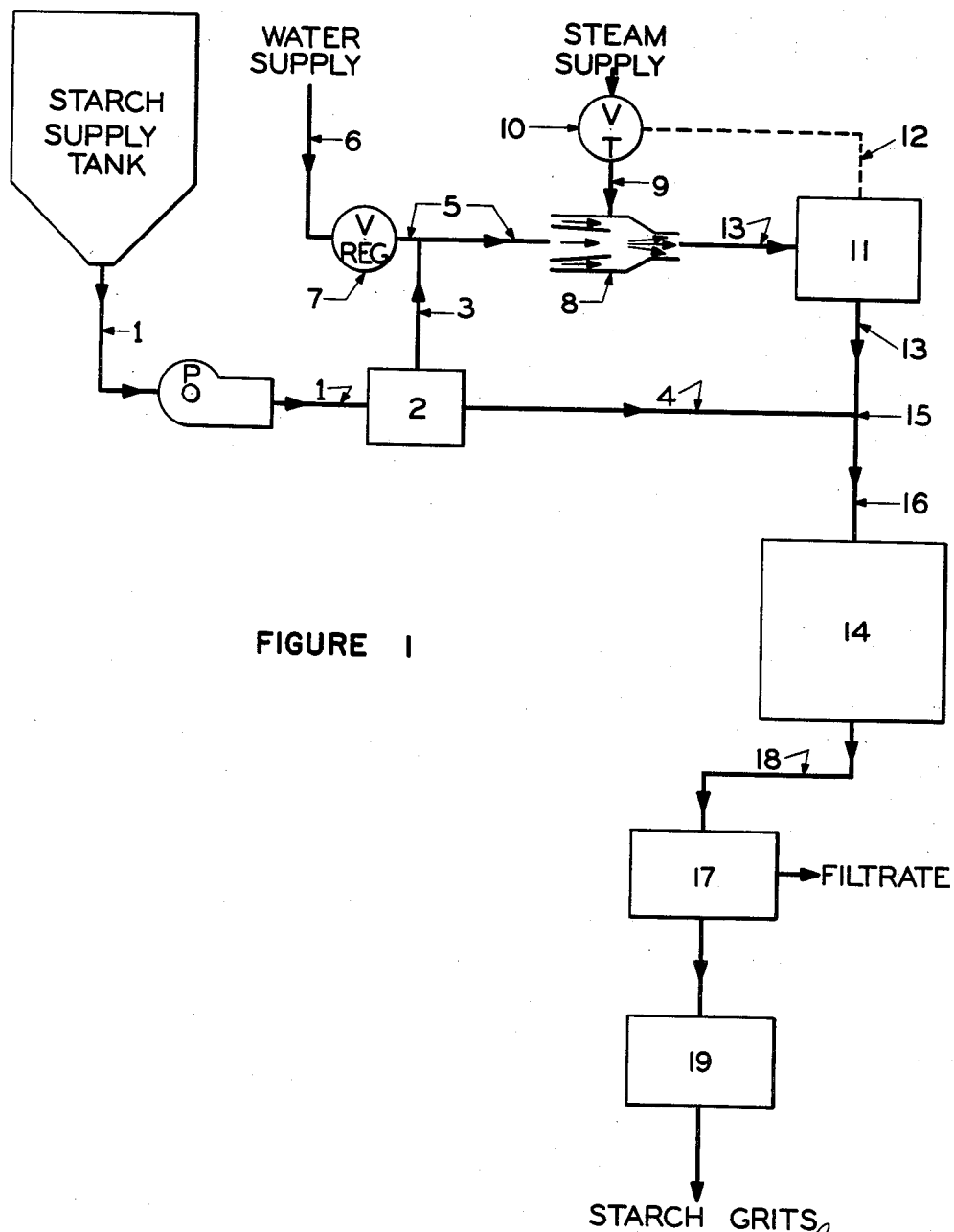

March 22, 1960     W. R. SCHWANDT     2,929,748
PRODUCTION OF STARCH GRITS
Filed Feb. 24, 1958

INVENTOR.
BY
AGENT

United States Patent Office 2,929,748
Patented Mar. 22, 1960

2,929,748

PRODUCTION OF STARCH GRITS

Walter Robert Schwandt, Decatur, Ill., assignor to A. E. Staley Manufacturing Company, Decatur, Ill., a corporation of Delaware Application February 24, 1958, Serial No. 717,177

5 Claims. (Cl. 127—71)

This invention relates to methods of producing starch grits. More particularly, it relates to improvements in wet production methods which include the careful processing of a water slurry of starch granules followed by recovering wet starch cake including the processed granules and drying the cake to obtain grits.

Dry starches in the form of fine powders consisting largely of separate granules are dusty. This property is objectionable because, in the absence of expensive preventive measures, it leads to unsightliness, waste, and dust explosions during manufacture and use of the product.

The dustiness of dry starch is greatly reduced by manufacturing and using the product in grits form. Starch grits are clusters or aggregates of individual ungelatinized granules meeting the following requirements:

(1) Grits are very large and heavy relative to a single granule. They are not dusty in the sense of a slow free fall through air, or of being supported by a slowly moving upward current of air.

(2) The individual starch granules in grits are bound together strongly enough to resist grit attrition during handling and transportation, i.e., the grits yield relatively low proportions of dusty material under these conditions or during a standard abrasion test.

(3) Grits either "dissolve" or disintegrate readily to form a "starch milk" when stirred with cold water, or their mixture with cold water yields a smooth homogeneous paste, free of "fish eyes" when heated with stirring to starch pasting temperatures.

(4) Grits consist chiefly of starch, either unpasted granules alone or a major portion of the granules with a minor portion of a starchy or starch-derived binder. The binder must not interfere with intended uses of the grits, as, e.g., textile sizing, paper coating, and beer brewing.

(5) Excluding binder, the starch in grits is essentially the same as the parent mill starch from which the grits are made. And including the binder, if any, the grits and parent starch are essentially alike with respect to end use.

Starch grits have been manufactured by many known methods, as, e.g., those described in the following United States patents:

541,941   789,127   2,168,524
545,128   2,093,293   2,178,235

All the prior art methods of manufacturing starch grits involve known difficulties. Some require such carefully controlled operating conditions that the necessary control is absent under factory conditions and product quality suffers. Others are relatively expensive because they require special equipment and long processing times.

In the prior art wet methods comprising the careful heating of a starch slurry to swell the granules slightly, then filtering the slurry and drying the filter cake to obtain grits, slurry-heating temperature is highly critical. If it is low, the grits lack desired attrition or abrasion resistance. If it is high, the grits abrasion resistance is satisfactory, but the filtration rate of the heated slurry is reduced, thus increasing processing cost. Cost of steam, or other means, to heat the slurry to proper granule-swelling temperature is appreciable. And although heating time is much less critical than the temperature, it does have a slight effect on slurry filtration rate and abrasion resistance of the grits. Consequently, the quality of grits made batchwise by this process varies from beginning to end of the batch, it being too expensive to stop or quench the granule swelling by cooling the heated slurry.

An important object of the present invention is to reduce heating costs in the wet methods of producing starch grits.

Another object of the invention is to provide novel means for heating a starch slurry in the wet production of starch grits, whereby the slurry heating time and temperature are easily and accurately controlled during large-scale factory production.

A further object of the invention is to eliminate the variation of product quality due to variable detention time in the slurry heating step of batch processes for making starch grits.

An additional object of the invention is to provide a novel wet method for making starch grits which is readily adaptable to conventional equipment for manufacturing starches, particularly corn and sorghum starches.

Another object of the invention is to provide a novel wet method for making starch grits which, when adapted to conventional starch filtration and drying equipment, does not markedly reduce the output of the equipment.

These and other objects of the invention will become apparent from the following description.

The foregoing objects are attained in accordance with the invention by heating an aqueous slurry of ungelatinized starch granules to a temperature within the range of about 150° to 180° F. to bring about a controlled swelling or gelatinization of the granules, then mixing the heated slurry with a relatively large portion of unheated or ungelatinized slurry, filtering or otherwise dewatering the combined slurries to obtain a wet starch cake, and drying the cake by non-pulverizing means to obtain starch grits or large pieces of dried starch cake which can be crushed to yield grits of desired size.

Also, according to the invention, the ratio of starch dry substance in the heated or binder portion of slurry to the starch dry substance in the unheated slurry is limited to the range of about 0.05 to 0.25.

It is convenient, but not essential to the invention, that the same starch be used in both slurries, or that the two slurries be derived from the same batch or lot of mill starch. It is also convenient, but not essential, that the temperature of the heated slurry remain substantially unchanged between its heating and mixing with the larger unheated slurry. For example, the minor slurry can be corn starch and the major one can be sorghum, or vice versa. And the heated slurry can be cooled below 150° F. and held at the lower temperature for substantial periods of time, if desired, before it is mixed with the main body of starch.

The following additional factors are not critical: kind, purity, and concentration of starch in the slurries; soluble impurities normally present in commercial mill starch slurries; slurry pH within the range normally encountered in commercial mill starches, i.e., from about 3 to about 9.

Although in principle the concentration of starch in the slurries is not critical, there are practical upper limits. These limits are greater for the unheated slurries than heated, other conditions being the same, because appreciable thickening of the slurry occurs during heating. They are also greater as a rule for modified starches, such as the oxidized and acid-treated thin boiling types, than unmodified or native starches, because the modified starches thicken less when heated with water.

Water slurries of the native starches such as corn, sorghum, wheat, and potato can be heated according to this invention at starch dry substance concentrations up to about 15% before serious operating difficulties due to thickening are encountered. Higher concentrations of the modified starches may be used, the increase being proportional to the degree of modification.

The upper limit of starch concentration in the unheated slurry is determined only by the pumpability or fluidity of the suspension. For most starches this ranges from 35% to 40% dry substance.

As indicated above, the invention is applicable to starch granules in general, including both native and modified starches. The latter includes oxidized, acid-treated, heat-treated, and pressure-modified starches. Nor is the invention limited to highly purified starches. It is applicable to starch slurries containing substantial proportions of foreign material such as gluten. Particularly, with reference to corn and sorghum starches, it is applicable to slurries containing appreciable proportions of incompletely ground or milled particles of the endosperm.

It will be seen, therefore, that broadly the invention consists of heating a minor quantity of starch granules in water slurry to a specified temperature range, then mixing the slurry at the specified temperature range or lower with a major quantity of starch granules in a water slurry at a temperature below the specified heating temperature range, dewatering the mixed slurries to recover a wet starch cake, and drying the cake by nondisintegrating means to recover starch grits. Less broadly the invention consists of the foregoing process wherein the minor slurry is heated to the desired temperature by passing it streamwise and continuously through a heating zone or device. Still more specifically, the invention consists of the foregoing process wherein the minor slurry is heated by passing it in the form of a continuous stream through a so-called jet heater, described hereinafter.

To obtain the full benefits of the invention, as set forth in the foregoing objects, it is necessary to heat the minor portion of starch slurry to desired temperature by a continuous process, i.e., by passing a slurry stream through a suitable heating device, then continuously mix the heated slurry with unheated slurry in correct proportions. It is immaterial to this invention whether the subsequent steps of dewatering the starch, drying the wet starch cake, and screening the dried material to obtain grits of desired size are carried out continuously or batchwise.

The preferred method of heating the minor starch slurry continuously is by means of a so-called jet heater. The essential elements in this method are: (1) a source of dry steam under superatmospheric pressure, (2) a steam pressure regulator, (3) a variable orifice projecting into a closed mixing chamber for regulating the flow of steam thereinto, (4) a source of starch-water slurry of known and controllable starch content, (5) a tube for carrying starch slurry projecting into the mixing chamber, (6) a variable-flow pump for delivering starch slurry to the mixing chamber, via the starch slurry tube, at known and controllable rates, (7) an outlet tube extending from the mixing chamber for carrying away the heated slurry, and (8) temperature indicating means probing the mixing chamber or the outlet tube at a short distance from the chamber. A jet cooker of this type is described in U.S. Patent 2,805,966.

With a jet heater of the foregoing general description, starch slurry can be heated to a selected temperature quickly, uniformly, and accurately. Output of the heater can be made large or small as desired by varying the dimensions of the equipment. Violent agitation and almost instantaneous mixing of steam and slurry occur in the mixing chamber. The steam condenses to water and the slurry temperature is raised to the desired value in a very short time. A highly desirable feature of the jet heater, from the standpoint of commercial operation, is that the heater will continue to deliver heated slurry at the same temperature so long as the steam pressure, the orifice setting, and the slurry pump rate setting remain the same.

Figure 1 of the drawing, a process flowsheet, illustrates the use of a jet heater in an embodiment of the invention. This embodiment includes continuous heating of a starch slurry stream and continuous mixing of the heated stream with a larger cool stream of starch slurry. The stock slurry flows by gravity or is pumped through the main supply pipe 1 to variable flow control valve 2 of known type. At this point the slurry is divided into two streams, a minor one in pipe 3 and a major one in pipe 4. At the junction of pipes 3 and 5, the minor slurry may be diluted with water from pipe 6. Dilution is controlled by flow controlling and indicating means 7 of known type. The diluted slurry then flows under pressure into jet heater 8 where it is rapidly and intimately mixed with steam from pipe 9. Rate of steam fed to the jet heater is controlled by valve 10 of known type, actuated by temperature sensing element 11 and remote control means 12, both of known types. Heated slurry issuing from the jet heater through outlet pipe 13 passes around the temperature sensing element on its way to mixing and storage tank 14. Heated slurry combines with unheated slurry at the junction 15 of pipes 4 and 14, and is mixed as it flows through pipe 16 to tank 14. It may be further mixed in tank 14 if desired. From tank 14 the mixed slurries are fed to continuous drum filter 17 through pipe 18. The starch filter cake is then transferred to drier 19, which yields grits or pieces of dried starch cake which can be crushed and screened to desired grit size.

According to the present invention, the ratio of starch dry substance in the heated slurry to that in the unheated slurry ranges from about 0.05 to about 0.25. Also, the temperature of the heated slurry leaving the jet heater may range from a low of about 150° F. to a high of about 180° F. To obtain the optimum combination of fast filtration and high abrasion resistance in the finished grit, the high slurry-heating temperatures are used with the low starch ratios, and vice versa. However, useful results may be obtained by combining any of the range-indicated temperatures with any of the range-indicated starch ratios.

Although mixing of steam and starch slurry, and heating of the latter, are practically instantaneous in the jet heater, it has been found that an appreciable minimum heating time of about two seconds is required to develop the maximum grit-binding quality of the heated slurry. Accordingly, it is preferred that the pipe between heater and mixer station (combined pipes 13 and 16 in Figure 1) be of such size and length that heated slurry detention time therein amounts to at least two seconds. It is to be understood, however, that the detention time is not critical and that it is not an element of the present invention. All the benefits and objects of the invention can be obtained even though the detention time is much less than two seconds.

On the other hand, the detention time may be made much longer than two seconds, if desired. From the standpoint of grit-binding quality there is practically no upper limit to the detention time, i.e., the slurry heating time. There are two associated disadvantages which mitigate against a detention or heating time more than a few second: (1) the slow leaching of starch dry substance from the granules, and (2) the provision of facilities to store or transport the heated slurry.

Preferably, the blend of heated and unheated starch slurries is continuously removed from the mixer station and fed to a dewatering device, preferably a filter. The wet starch cake obtained at this point is then fed to a starch drier. The latter may be batch or continuous, and any of several known types which dry the cake in relatively large pieces,. A continuously moving belt type of starch drier is suitable for this step in the process.

The dried cake is crushed and screened. Grits of one or more screen sizes are bagged or stored in bulk. Oversize pieces of dried cake are returned to the crusher, and fines are returned to the stock slurry tank at the head of the process.

The following specific examples illustrate in more detail several embodiments of the invention:

Example 1

A water slurry of commercial single-washed unmodified corn starch at 100° F. containing 40% starch dry substance is pumped from a supply tank to a split flow controller (2 in Figure 1) set for a total flow of 40 gallons per minute (g.p.m.). A minor flow of 5 g.p.m. from the flow controller is diluted with 18 g.p.m. of water at 100° F. and fed to a jet heater (8 in Figure 1) where the diluted slurry (10% starch dry substance) is heated to 167° F. This temperature is maintained for about 2 seconds while the heated slurry moves away from the jet heater through pipe 13 to the junction with pipe 4 carrying the major flow of 35 g.p.m. of unheated and undiluted starch slurry from the split flow controller where the diluted slurry (10% starch dry substance) is heated to 167° F. The two slurries mix at pipe junction 15 and while flowing together in pipe 16 leading from the junction to a storage tank (14 in Figure 1). The slurry mixture, at a temperature of about 125° F., is fed to continuous vacuum drum filter 17 at the rate of about 60 g.p.m. The wet starch filter cake is stripped from the filter and dried in a continuous horizontal moving belt drier. The dried cake is crushed and screened to yield grits of desired size. The grits yield 12% dust by the abrasion test described hereinafter.

Example 2

The method of Example 1 is repeated except that the steam flow to the jet heater is increased so that the starch slurry passing through it is heated to 180° F. instead of 167° F. The grits by this method yield only 5% dust by the described abrasion test.

Example 3

The method of Example 1 is repeated except that the split flow controller is set to deliver 2 g.p.m. of 40% starch slurry to the dilution and heating station, and 38 g.p.m. of the 40% starch slurry to the mixing station. The final grits yield 15% dust by the described abrasion test.

Example 4

The method of Example 1 is repeated except that the split flow controller is set for 4 and 36 g.p.m. and the steam flow to the jet heater is adjusted to heat the 10% starch slurry to about 180° F. The final grits yield 6% dust by the abrasion test.

Example 5

The method of Example 1 is repeated except that the split flow controller is set to deliver 2.5 and 37.5 g.p.m. of the 40% starch slurry, and the diluted slurry is heated to about 172° F. as it passes through the jet heater. The grits yield 10% dust by the abrasion test.

Example 6

The method of Example 5 is repeated except that the slurry heating time is reduced from about 2 seconds to about 1 second by joining the jet heater outlet pipe (13 in Figure 1) with the major slurry pipe (4 in Figure 1) at a point closer to the jet heater. The grits yield 14% dust by the abrasion test.

Example 7

The method of Example 1 is repeated except that the split flow controller is set for 8 and 32 g.p.m., the diluted slurry is heated to only 160° F. by the jet heater, and the heating time is increased to 10 seconds by a five-fold lengthening of the heater outlet pipe (13 in Figure 1). The final grits yield 14% dust by the abrasion test.

Example 8

The method of Example 1 is repeated, except that grain sorghum starch is used instead of corn, the split flow controller is set for 2.5 and 37.5 g.p.m., and the diluted slurry is heated to 175° F. by the jet heater. The grits by this method yield 12% dust by the abrasion test.

Example 9

The method of Example 1 is repeated except that the split flow controller is set for 2.5 and 37.5 g.p.m., and the slurry heating time is increased to 5–10 minutes as follows: A 100 gal. storage tank adapted to receive heated slurry is interposed between the jet heater and pipe junction 15 (see Figure 1). Heated diluted slurry is collected in this tank for 5 minutes. During this collection period, unheated and undiluted slurry is collected in the mixing and storage tank (14 in Figure 1) at the rate of 37.5 g.p.m. At the end of the 5 minute period, the flow of 40% starch slurry to the split flow controller is shut off, and the heated slurry, collected in the 100 gal. storage tank, is then added with stirring to the unheated slurry in tank 14 (Figure 1) at the same rate it was collected in the 100 gal. tank. The final grits yield 10% dust by the abrasion test.

Example 10

This example illustrates an embodiment of the invention employing batch heating of the slurry. 600 gallons of a well-stirred water slurry of commercial single-washed unmodified corn starch at about 100° F. containing 10% starch dry substance is heater to 168° F. with injected steam. This requires 15 minutes. The steam is shut off and the heated slurry is pumped rapidly into, and mixed with, 1000 gallons of a water slurry of the same kind of starch containing 40% starch dry substance. After all the heated slurry is thoroughly mixed with the other, the mixture is filtered, the wet filter cake is dried in a horizontal moving belt drier, and the dried cake is crushed and screened to furnish grits of the desired size. The grits yield 8% dust by the described abrasion test.

Example 11

The unmodified corn starch in Example 1 is replaced with an acid-modified thin boiling corn starch having a viscosity of 20 seconds as determined by the Scott method using 15 grams of starch, the split flow controller is set for 2 and 38 g.p.m., and the diluted slurry is heated to 170° F. by the jet heater. The final grits yield 10% dust by the test.

Example 12

The method of Example 10 is repeated except that the diluted slurry is heated for 30 minutes at 150° F. and the volume of unheated 40% starch slurry is reduced to 600 gals., thus making the ratio of heated to unheated starch dry substance about 0.22. The final grits yield 18% dust by the abrasion test.

*Scott viscosity test.*—This test, referred to in foregoing Example 11, is the one described at p. 119 in the second edition of "Chemistry and Industry of Starch," by R. W. Kerr.

*Grit abrasion test.*—From a representative sample of grits, obtain the portion which passes through a #4 U.S. screen but which is retained on a #8 U.S. screen. Weigh 100 grams of this screen fraction into a standard 16 oz. wide-mouth jar. Cap the jar and shake it with the enclosed grits on a size 2 International bottle shaker for 15 minutes at a speed of 470 r.p.m. Then transfer the grits from the jar to a #60 U.S. screen, cap the screen and shake it vigorously for 2 minutes on a screen shaker. Weigh the material passing through the screen and report it as percent dust by abrasion.

I claim:
1. The process of producing starch grits which comprises heating a water slurry of starch granules to a temperature within the range of about 150° F. to about 180° F., mixing said slurry with a second water slurry of starch granules, the temperature of the second slurry being less than 150° F., the ratio of starch dry substance in the heated slurry to that of the second slurry ranging from about 0.05 to about 0.25, dewatering the mixed slurries to obtain a wet starch cake, and drying said cake to obtain grits.

2. The process improvement according to claim 1 wherein the heating of the starch slurry is accomplished by passing it as a continuous stream through a heating zone.

3. The process improvement according to claim 1 wherein the starch in the heated slurry is corn starch.

4. The process improvement according to claim 1 wherein the starch in the heated slurry is sorghum starch.

5. The process improvement according to claim 2 wherein the heating of the starch slurry is accomplished by continuously injecting steam into said starch slurry as it passes through said heating zone.

References Cited in the file of this patent
UNITED STATES PATENTS

| | | |
|---|---|---|
| 1,175,114 | Bauer | Mar. 14, 1916 |
| 2,098,293 | Jefferies | Nov. 9, 1937 |